United States Patent [19]

Oddo

[11] 4,142,795

[45] Mar. 6, 1979

[54] DEVELOPER APPARATUS FOR DIAZO COPYING MACHINES

[75] Inventor: Eugene P. Oddo, Mt. Prospect, Ill.

[73] Assignee: Addressograph-Multigraph Corporation, Los Angeles, Calif.

[21] Appl. No.: 837,742

[22] Filed: Sep. 29, 1977

[51] Int. Cl.$^2$ ........................ G03B 27/30; G03D 7/00

[52] U.S. Cl. .................................... 355/106; 354/299; 354/300; 118/261

[58] Field of Search ................. 354/318, 319, 20, 321, 354/322, 338, 339, 299; 355/27, 28, 106, 64, 110, 30; 118/248, 259, 261

[56] References Cited

U.S. PATENT DOCUMENTS

| | | | |
|---|---|---|---|
| 3,307,466 | 3/1967 | Fukuda | 354/318 |
| 3,440,944 | 4/1969 | Endermann et al. | 354/299 |
| 3,616,742 | 11/1971 | Boyle et al. | 354/319 |
| 3,626,833 | 12/1971 | Koch | 118/261 |
| 3,682,082 | 8/1972 | Stievenart | 354/299 |
| 3,704,662 | 12/1972 | Johnson et al. | 354/318 |
| 3,714,882 | 2/1973 | Schranz et al. | 354/318 |
| 3,839,726 | 10/1974 | Reichardt | 354/299 |
| 3,943,540 | 3/1976 | Vanderheyden | 354/318 |
| 4,056,824 | 11/1977 | Iiyama et al. | 354/299 |

*Primary Examiner*—L. T. Hix
*Assistant Examiner*—Alan Mathews
*Attorney, Agent, or Firm*—M. A. Kondzella; G. Jameson; R. S. Hulse

[57] ABSTRACT

Apparatus is provided for developing diazotype copy material by the application thereto of a quantity of liquid developer and comprises a heated enclosure for housing a pair of rotatable applicator rollers positioned in axially spaced apart parallel relation. Developer liquid is supplied to the surface of the rollers, and a pair of blade members is mounted adjacent each of the rollers for engagement therewith. One of the blade members of each pair meters the developer liquid on the roller and the other blade member forms a developing zone through which copy sheets are passed to be developed.

7 Claims, 4 Drawing Figures

DEVELOPER APPARATUS FOR DIAZO COPYING MACHINES

BACKGROUND OF THE INVENTION

This invention relates generally to apparatus for developing diazotype copy material and, more particularly, to apparatus which applies a liquid developing agent in metered amounts to exposed diazo copy material, thereby to produce dry-to-the-touch developed copies.

The method of developing diazo copy material by the application of relatively small, metered quantities of liquid developer is described in U.S. Pat. No. 3,446,620 and assigned to the same assignee.

Apparatus for carrying out the above method is disclosed in U.S. Pat. Nos. 3,626,833, 3,640,203 and 3,704,662, also assigned to the same assignee.

In the last-mentioned patent there is described developing apparatus comprising an applicator roller adapted to carry a limited quantity of developer fluid. A pressure applying blade is positioned adjacent the surface of the roller for engagement with the roller surface, and the area between the blade and roller surface forms a copy material developing zone. A second, fluid metering blade is also mounted for engagement with the roller surface at a position spaced 180° from the first blade to equalize the forces applied to the roller. Developer fluid is supplied to the roller and is dispersed by the metering blade over the surface of the roller. The copy material is developed as it passes through the developing zone with the pressure blade applying pressure to the roller surface along a line of contact therewith equal to the force applied by the metering blade.

The foregoing described pressure-diazo process offers advantages over early types of diazo reproduction processes conventionally termed moist and ammonia or dry processes, as based on the conditions necessary to develop the exposed light-sensitive diazo material. The moist process requires the application of relatively large amounts of developing liquid, which are normally low in concentration of the active ingredients, and any excess liquid is squeegeed off and the sheet dried. Ammonia machines, which are used in the dry diazo process, require ventilation to the outside in order to remove the strong ammonia fumes. Consequently, these two well known diazo processes have certain inherent disadvantages over the pressure-diazo process referred to above, that detract from their being utilized more widely in office copying installations where the economics of the diazo processes are important and could be more fully realized.

The principal advantage of the pressure-diazo process is that the copy sheet emerges immediately after development in a dry-to-the-touch condition. Also, photocopying machines utilizing the pressure-diazo process are extremely simple to operate, substantially odor-free, and quite compact obviating the need for exhaust or drying equipment such as may be necessary to render the sheet sufficiently dry for handling as it emerges from the equipment.

However, while pressure-diazo machines offer certain advantages, they are unable to produce high volume reproduction and copies of a quality comparable to those of an ammonia diazo process. The present invention provides a developer apparatus for use with, for example, a machine as described in the above U.S. Pat. No. 3,704,662, which obviates the disadvantages of present day pressure-diazo machines and is capable of producing high volume reproduction and quality copies comparable to ammonia process diazo machines.

SUMMARY OF THE INVENTION

The present invention provides a pressure-diazo developer apparatus comprising a pair of applicator rollers positioned in tandem axially spaced and parallel relation rotatably mounted in a heated enclosure. The dual rollers in association with the heated enclosure enhance the copy quality and permit high volume reproduction. Thus, in a single roller machine as in the prior art, interstices appear in the developed copy sheet caused by the grinding pattern of the roller surface and the texture of the copy paper. However, with dual rollers the second roller is effective to fill in the interstices missed by the first roller, thereby producing a diazo copy of a quality considerably higher than that which can be produced with a single roller developer apparatus.

It is an object of the present invention to provide an improved pressure-diazo developer apparatus, utilizing a dual applicator roller arrangement within a heat enclosure, for producing high volume reproduction of quality diazo copies.

A feature of the invention is to provide a pressure-diazo developer apparatus which is simple in construction, economical to manufacture and reliable in operation.

Other objects, features and advantages of the invention will appear hereinafter as the description proceeds.

IN THE DRAWING

DESCRIPTION OF THE PREFERRED EMBODIMENT

Figure 1:
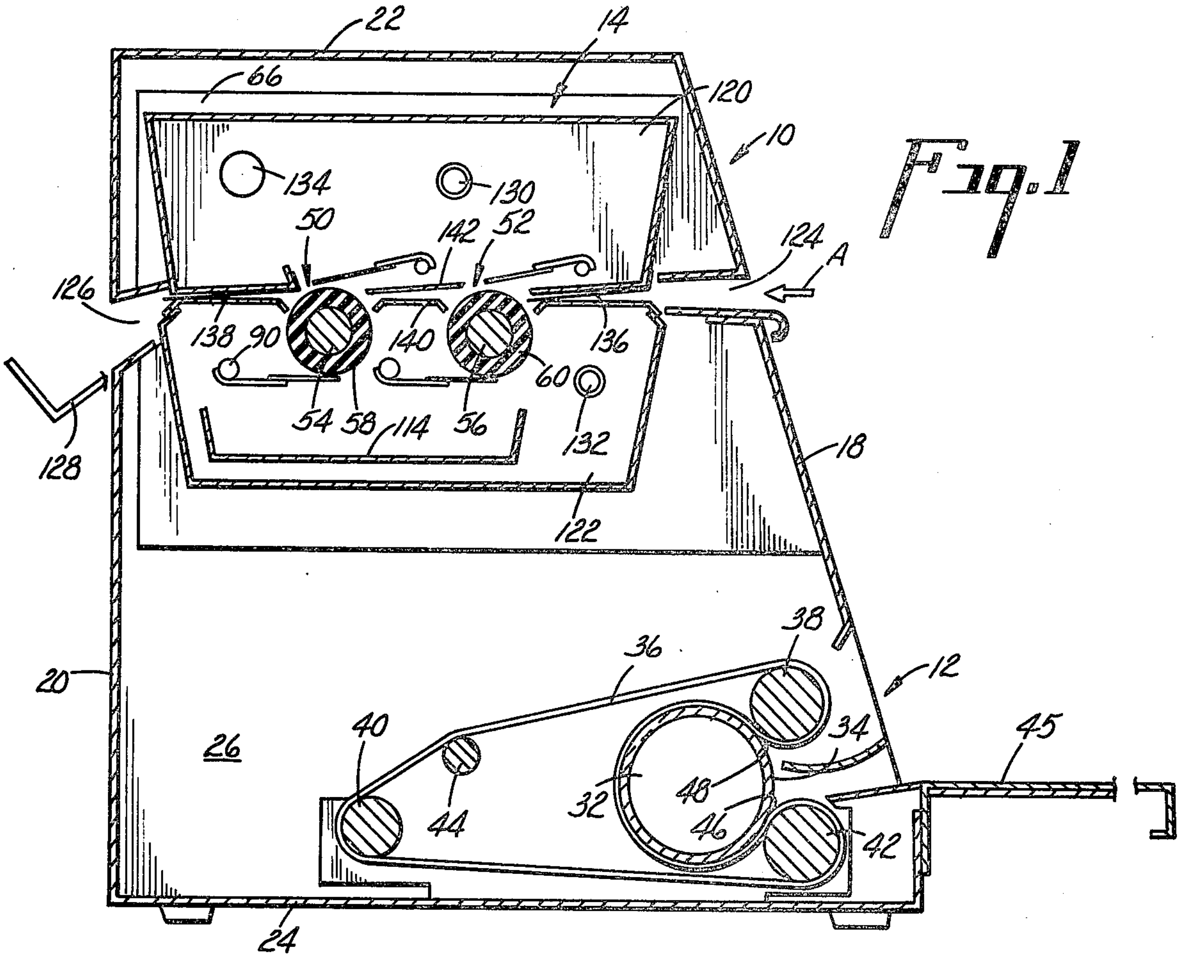
FIG. 1 is an end sectional view of a diazotype copying machine incorporating a developing apparatus according to the invention.

With reference to FIG. 1, there is shown a diazotype copying machine indicated generally by the reference numeral 10. The machine includes an exposure apparatus and a developing apparatus indicated generally by the reference numerals 12 and 14 respectively. The copying machine also comprises a housing including a front wall 18, a rear wall 20, an upper wall 22, a bottom wall 24, and side walls, only one shown at 26 in FIGS. 1 and 3, interconnecting the front, rear, upper and bottom walls.

The lower section of the housing includes the copy sheet exposure apparatus 12 for exposing a diazo sensitized copy sheet to light while the copy sheet is in surface-to-surface contact with an original tracing, for the purpose of imaging the copy sheet. The particular copy sheet exposure apparatus shown may be of the kind disclosed in the above U.S. Pat. No. 3,704,662, for example, and comprises a rotatable lamp 32 about an outer surface 34 of which is carried a sandwiched copy sheet and original tracing (not shown) for exposure of the former. An endless belt 36 is also mounted for movement along rollers 38, 40 and 42. A smaller roller 44 provides tension to the belt 36 to ensure that the latter is in close contact with the lamp 32.

The sandwiched original tracing and copy sheet are fed over a shelf 45 into an entrance 46 adjacent the roller 42 and between the belt 36 and the outer surface 34 of the lamp 32. The original and copy sheet are carried about the lamp 32 and depart at an exit 48 adjacent the roller 38. At this point the copy sheet has been exposed. The copy sheet is separated from the original tracing and is now ready for development in the developing apparatus 14 in the upper section of the housing.

The developing apparatus comprises a pair of applicator rollers 50 and 52 having central metal shaft portions 54 and 56, respectively, and outer or peripheral layers 58 and 60, respectively, of a smooth non-porous resilient material such as rubber. Each of the outer layers 58 and 60 is specially prepared to form a developer fluid carrier surface having irregular micro-recesses of varying depths and sizes. The rollers 50 and 52 in addition to applying developer liquid to a copy sheet also transport the copy sheet through the developing apparatus 14. For a more detailed description of the roller surface and its preparation, the reader's attention is directed to U.S. Pat. Nos. 3,626,833 and 3,640,203, assigned to the same assignee.

Since both of the rollers 50 and 52, and the components associated with each of the rollers are identical in construction and operation, only one of the rollers will be described in detail hereinafter.

Figure 3:
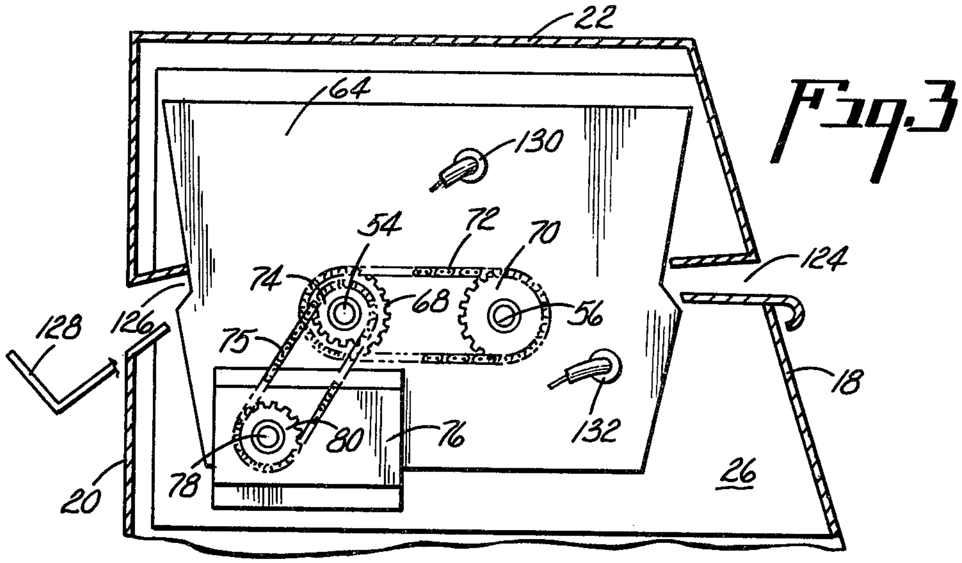
FIG. 3 is a partial end view in section showing a drive means for rotating the applicator rollers of the developing apparatus.
Figure 4:
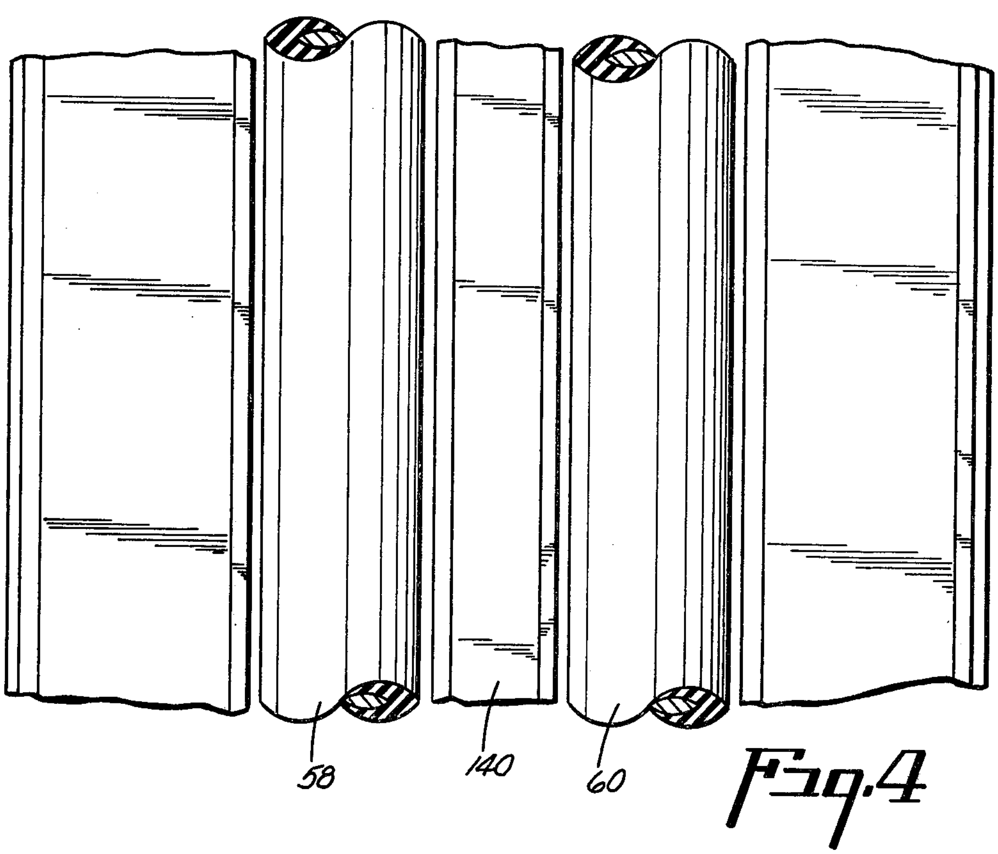
FIG. 4 is a partial plan view of the applicator rollers of the developing apparatus as viewed on the line 4—4 of FIG. 2.

With reference to FIGS. 1 and 3, the roller 50 is mounted for rotation between vertically extending walls 64 and 66 in suitable bearings mounted on the walls. A sprocket wheel 74 is mounted at the end of the shaft 54, and a drive motor 76 provides power for driving the applicator roller 50 through a shaft 78 having a sprocket drive wheel 80 mounted thereon. An endless chain 75 connected to the aforementioned sprocket wheels serves to transfer the power provided by the motor 76 to the applicator roller 50 for rotation of the latter. A second sprocket wheel 68 is provided on the end of the shaft 54 and a sprocket wheel 70 is provided on the shaft 56. The sprocket wheels 68 and 70 are connected by an endless chain 72 for transferring power provided by the motor 76 to the applicator roller 52 for rotating the latter.

Figure 2:
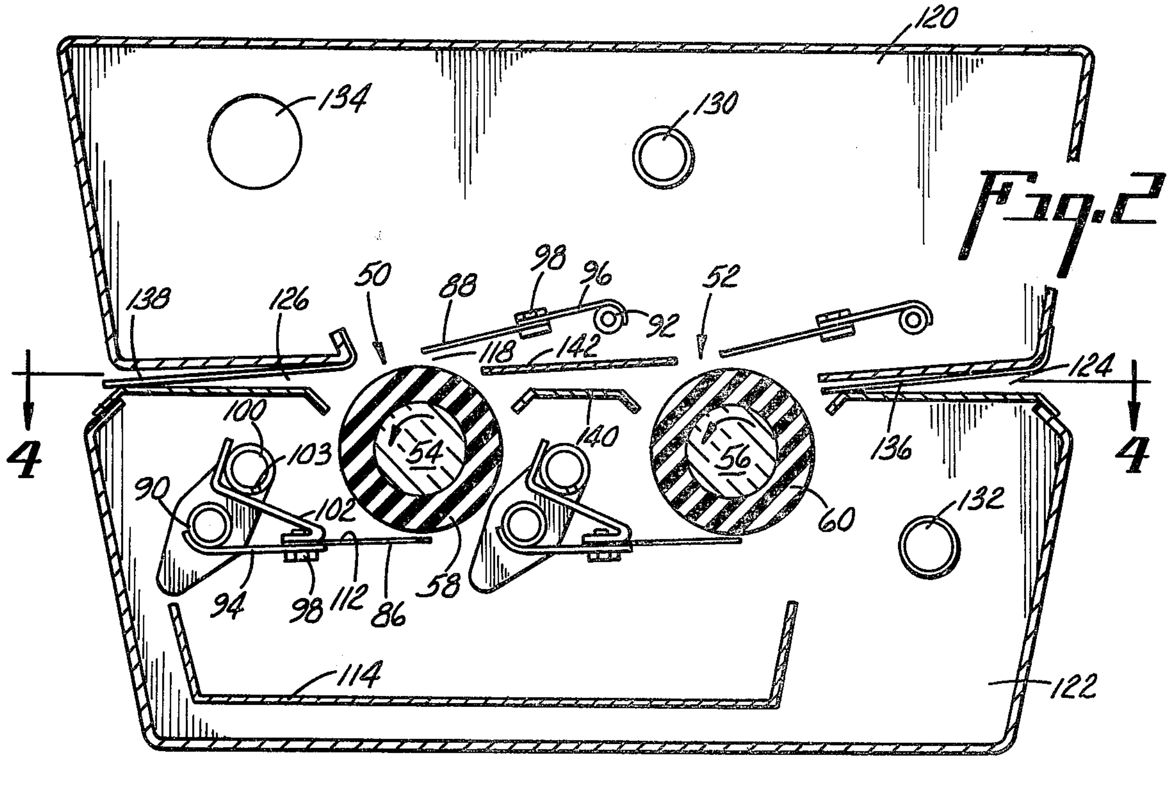
FIG. 2 is an end sectional view in detail of the developing apparatus of FIG. 1 on an enlarged scale.

As shown in FIG. 2, positioned on opposite sides of the applicator roller 50, spaced 180° from each other thereabout, is a pair of blade members 86 and 88. Each of the blade members is mounted on a respective rotatable support herein taking the form of tubular shafts 90 and 92, by means of blade holder members 94 and 96, respectively, attached thereto. The blades, each fabricated from a flat length of spring steel or the like, are fastened to a respective blade holder member by fasteners such as bolts 98.

The tubular shafts 90 and 92, which are also mounted between the walls 64 and 66, are rotatable in a counter clockwise direction as viewed in FIG. 2 to cause the blade members 86 and 88 to engage the surface 58 of the roller 50. The blade members are caused to be bowed when in contact with the roller surface to make tangetial contact therewith.

A tubular conduit 100, mounted on a bracket 102 and connected to the blade holder member 94, is provided to dispense developer liquid to the surface 58 of the roller 50. Although not shown in the drawing, a flexible tube may be coupled at one end of the conduit 100 and connected via a developer fluid pump to a reservoir of fluid developer in a conventional manner. Fluid pumped through the tube exits from the conduit 100 through spaced apertures 103 (FIG. 2) provided in a wall thereof. Developer liquid dispensed from the conduit 100 is poured onto a surface 112 of the blade 86 and, upon the latter making engagement with the surface of rotating roller 50, is applied or metered onto the roller surface 58.

Metering blade member 86, together with the roller 50 having the surface 58, transfers a controlled amount of developer fluid to a copy sheet being developed as the sheet is transported through the developing apparatus 14 sequentially to the rollers 50 and 52. The blade member 86 wipes away excess developer fluid which in turn drains into a trough 114 mounted beneath the applicator roller 50 and the metering blade 86.

The second blade member 88, when engaged with the roller surface 58, applies to the latter surface pressure along a line of contact therewith equal to the force applied by the blade member 86, 180° about the roller 50. The contact area forms a developing zone 118 (FIG. 2) through which copy sheets are passed to be developed.

The physical movement of the blade members is controlled by a control-linkage and electrical contact assembly as fully shown and described in the aforementioned U.S. Pat. No. 3,704,662.

With reference now to FIGS. 1 and 2, it will be seen that the developing apparatus 14 provides a substantially enclosed housing comprising an upper chamber 120 and a lower chamber 122 mounted between the side walls. The chambers are arranged so as to provide a copy sheet ingress 124 and an egress 126 from which the developed copy sheet may be discharged from the developer apparatus to a hopper 128. Further, each of the chambers is provided with an electrical heating element 130 and 132, spaced axially and parallel with the applicator rollers 50 and 52 and extending substantially the full length of the chambers. The heating elements are preferably of a rating of approximately 250w to provide within the chambers a temperature of about 100° F.-120° F. An exhaust port 134 is provided in the upper chamber 120 to create a pressure less than the pressure of the atmosphere inside the chamber by exhausting the chamber to the atmosphere.

To further maintain the chambers 120 and 122 substantially enclosed, the ingress 124 is provided with a flexible seal 136 and the egress 126 is provided with a similar seal 138, to thereby maintain the ingress and egress passages closed during development of a copy sheet, while permitting the copy sheet to pass therethrough in response to displacing or lifting the seals by the copy sheet entering and exiting into and out of the developing apparatus. The seals 136 and 138 may be fabricated of silicone rubber, plastic or the like so as to resist attack by chemically active developer material and to prevent scratching or marring the surface of a copy sheet being passed through the developer apparatus. For the reason of the chemically active developer, the chambers 120 and 122 are preferably made of stainless steel.

Positioned between the applicator rollers 50 and 52 is a shelf 140 for supporting a copy sheet passing through the developing unit. A guide plate 142 for guiding a copy sheet in its travel through the developer apparatus is positioned above the shelf 140.

In the operation of the apparatus, a copy sheet to be developed is fed into the ingress 124, image-face down, and under the seal 136 to the applicator roller 52. The developing liquid supplied to the roller is metered on the roller surface by the blade 86 which is moved into contact with the roller surface, and the copy sheet is advanced through the developing zone 118 whereat it is pressed against the surface of the roller by the pressure blade 88.

The roller 52 transports the copy sheet over the shelf 140 and the guide plate 142 directs the sheet to the applicator roller 50. As with the roller 52, the blades 86 and 88 meter the developing liquid and press the copy sheet against the roller surface respectively, and the roller 50 transports the copy sheet under the seal 138, through the egress 126 to the hopper 128.

From the foregoing, it will be appreciated that the present invention provides a novel pressure diazotype copying machine comprising a dual applicator roller arrangement in association with a heated enclosure to enchance the copy quality and permit high volume reproduction. Thus, if for any reason a portion of the copy sheet should not be completely developed as it passes the first applicator roller, that undeveloped portion will be developed by the second applicator roller.

What is claimed is:

1. An apparatus for developing a diazotype copy sheet including a developer unit having a supply of developer liquid, comprising:

- a chamber comprising an ingress and an egress for passage of a copy sheet through the chamber for development;
- a first and a second roller rotably mounted in the chamber in tandem axially spaced apart parallel relation, each said roller having a surface adapted to carry a quantity of developer liquid;
- means for applying developer liquid from the supply to the first and the second roller;
- a first and a second blade means associated with each of the first and second rollers, said first blade means being engageable with the surface of each said roller to form a developing zone along a line of contact therebetween through which the copy sheet is passed for development, and said second blade means being engageable with the surface of each said roller for wiping excess developer liquid from the surface;
- drive means for rotating the first and second rollers; and
- means for heating the chamber to produce an elevated temperature therewithin.

2. An apparatus as set forth in claim 1 further comprising an exhaust means in the chamber for producing a pressure therewithin less than the pressure of the atmosphere.

3. An apparatus as set forth in claim 1 in which the chamber comprises an upper and a lower section, and the heating means comprises electrical heating elements mounted in the upper and lower sections for maintaining the temperature in the chamber between 100° F.-120° F.

4. An apparatus as set forth in claim 1 further comprising flexible seal means for maintaining the ingress and egress of the chamber closed during development of a copy sheet.

5. In a copying machine for making a copy of an original document on a copy sheet, including an exposure station whereat a superimposed original and copy sheet are illuminated to create an image of the former on the latter, and a developing station including a developer unit having a supply of developer liquid, comprising:

- a chamber comprising an ingress and an egress for passage of the copy sheet through the chamber for development;
- a first and a second roller rotably mounted in the chamber in tandem axially spaced apart parallel relation, each said roller having a surface adapted to carry a quantity of developer liquid;
- means for applying developer liquid from the supply to the first and second rollers;
- a first and a second blade means associated with each of the first and second rollers, said first blade means being engageable with the surface of each said roller to form a developing zone along a line of contact therebetween through which the copy sheet is passed for development, and said second blade means being engageable with the surface of each said roller for wiping excess developer liquid from the surface;
- drive means for rotating the first and second rollers; and
- heater means for producing an elevated temperature to create a heated atmosphere within the chamber.

6. A method of developing a diazotype copy sheet, comprising the steps of:

- applying a developer liquid to a surface of each of a first and a second roller mounted in axially spaced apart parallel relation in a heated chamber;
- providing a first blade means adapted for engagement with the surface of each of the rollers for forming a developing zone along a line of contact between the first blade means and the surface of each said roller through which a copy sheet is passed for development, and a second blade means for wiping excess developer liquid from the surface of each said roller; and
- transferring the developer liquid from the first and the second roller to a copy sheet transported sequentially through the developing zone of each of the first and second rollers.

7. A method as set forth in claim 6 comprising the further step of exhausting the chamber to the atmosphere to produce a pressure within the chamber less than the pressure of the atmosphere.

* * * * *